United States Patent [19]

Orac et al.

[11] Patent Number: 4,875,979
[45] Date of Patent: Oct. 24, 1989

[54] TREATMENT OF PETROLEUM COKES TO INHIBIT COKE PUFFING

[75] Inventors: Thomas H. Orac, Strongsville; Herbert C. Quandt, Lakewood; David R. Ball, Bay Village, all of Ohio

[73] Assignee: Union Carbide Corporation, Danbury, Conn.

[21] Appl. No.: 164,749

[22] Filed: Mar. 7, 1988

[51] Int. Cl.$^4$ ........................ C10B 57/00; C01B 31/04
[52] U.S. Cl. ........................................... 201/5; 201/17; 201/20; 264/29.5; 423/449
[58] Field of Search ............... 201/5, 17, 20; 423/448, 423/449, 461; 264/29.1, 29.5

[56] References Cited

U.S. PATENT DOCUMENTS 3,642,962 2/1972 Wallouch ............................ 201/17

Primary Examiner—Joye Woodard
Attorney, Agent, or Firm—Cornelius F. O'Brien

[57] ABSTRACT

A process for treating high sulfur petroleum coke to inhibit puffing is disclosed wherein particles of the petroleum coke are contacted, in the absence of a binder, with a compound containing an alkali or alkaline earth metal selected from the group consisting of sodium, potassium, calcium and magnesium, at an elevated temperature above that at which the alkali or alkaline earth metal compound begins to react with carbon, but below the temperature at which the coke particles would begin to puff in the absence of the compound. The coke particles are maintained at the elevated temperature for a sufficient period of time to permit the reaction to proceed and allow products of reaction to penetrate into the particles and form an alkali-or alkaline-earth-metal-containing deposit throughout the mass of the particles; and then cooling the so-treated coke particles.

23 Claims, 17 Drawing Sheets

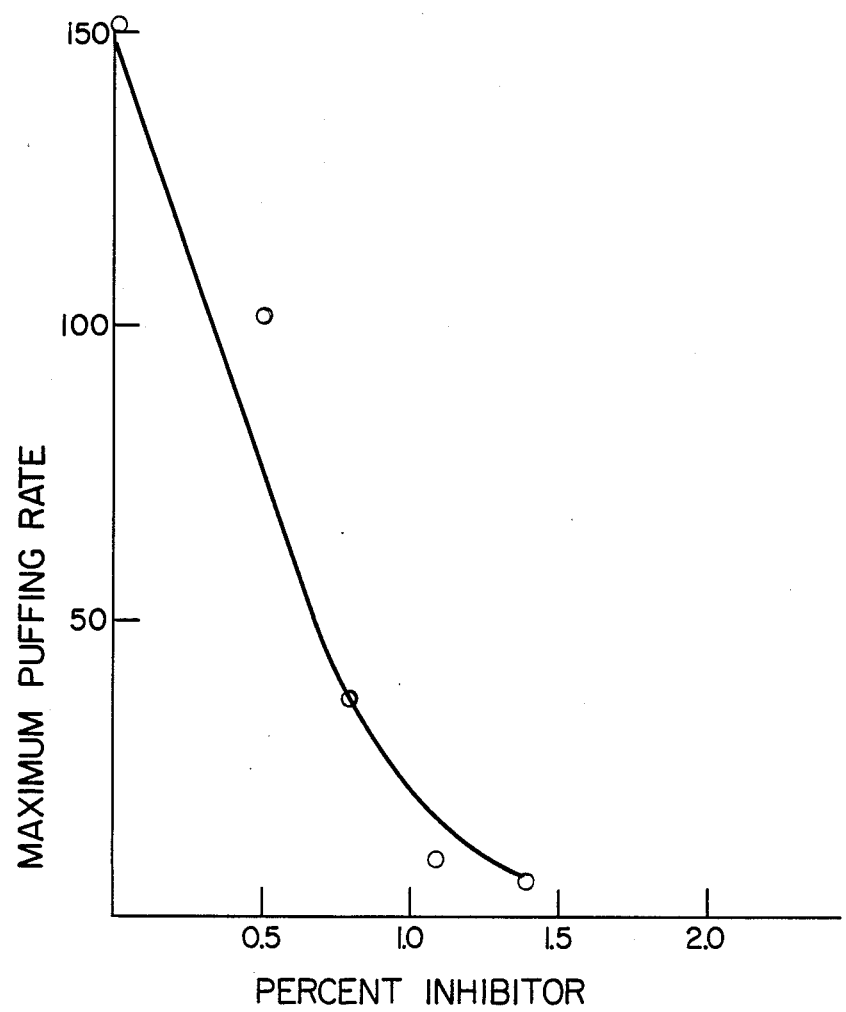
F I G. 8

TREATMENT OF PETROLEUM COKES TO INHIBIT COKE PUFFING

The present invention relates to carbon and graphite articles, particularly electric furnace electrodes, and to a process for producing such electrodes of improved quality using high sulfur petroleum cokes. More particularly, the invention relates to a process for treating calcined petroleum cokes with a puffing inhibitor prior to incorporating the coke into a carbonaceous mix. In an important aspect, the invention relates to a carbonaceous filler or aggregate containing discrete particles of a calcined petroleum coke having a high sulfur content and having a puffing inhibiting agent distributed throughout the mass of the particles, the inhibiting agent serving to reduce or eliminate coke puffing during manufacture and use of graphite and carbon articles.

BACKGROUND OF THE INVENTION

It is common practice in the production of carbon and graphite electric furnace electrodes to employ a calcined petroleum coke (i.e., raw petroleum coke that has been heated to temperatures above about 1200° C.) as the filler or aggregate material and to mix this filler or aggregate with a carbonaceous binder such as pitch. The mixture is formed into the shape of the electrode, either by molding or extrusion, and is then baked at an elevated temperature sufficient to carbonize the binder (e.g. about 800° C.). In those cases where a graphitized electrode is required, the baked electrode is further heated to temperatures of at least about 2800° C.

Petroleum coke particles have a tendency to "puff", that is, to expand and even to split when heated to temperatures above about 1500° C., if they contain more than about 0.3% by weight sulfur. Electrodes made from such cokes lose density and strength and sometimes split lengthwise when heated to these high temperatures. As indicated, graphite electrodes are normally heated to at least 2800° C. during their manufacturing process. Carbon electrodes, which are not graphitized during the manufacturing process, reach temperatures between about 2000° C. and 2500° C. during their use in silicon or phosphorus furnaces.

Puffing is associated with the release of sulfur from its bond with carbon inside the coke particles. If the sulfur containing vapors cannot escape from the particles or from the electrode fast enough, they create internal pressure which, in turn, increases the volume of the particles and may cause the electrode to split.

The conventional remedy for puffing has been to add an inhibitor such as iron oxide or other metal compound to the coke-pitch mixture before the electrodes have been formed. It has been shown, for example, that about 2 weight percent iron oxide can be effective to reduce coke puffing. Some cokes that have a higher tendency to puff or start puffing at a lower temperature cannot be adequately controlled by iron oxide.

Various attempts have been made to provide other improved puffing inhibition methods which overcomes the above and other disadvantages of the prior art. For example, in U.S. Pat. No. 2,814,076 issued to J. W. Gartland on Nov. 26, 1957, there is disclosed an improved method of producing graphite articles such as electric furnace electrodes wherein an alkali metal compound from group I of the Periodic table, notably sodium carbonate, is employed as a puffing inhibitor. The sodium carbonate may be added to the article by impregnating the article after baking with a solution of the sodium carbonate or by adding the puffing inhibitor directly to the coke-pitch mix. Although adding sodium carbonate to the coke-pitch mix is more convenient than adding it to the baked article, this method produces a finished electrode of inferior quality, i.e., lower density and lower strength.

Another problem encountered when the puffing inhibitor is added directly to the coke-pitch mix is that sodium carbonate reacts with acidic extrusion aids which may be employed in the mix. Unfortunately, this reaction often causes extrusion problems leading to poor structure of the electrode.

Another approach to solving the problem of coke puffing in the production of carbon and graphite electrodes is disclosed in U.S. Pat. No. 3,506,745 issued to L. H. Juel et al. on Apr. 14, 1970. In this approach, high sulfur petroleum coke particles are treated prior to their incorporation in a carbonaceous mix by contacting the coke particles with a puffing inhibitor and heating the particles in a substantially non-oxidizing atmosphere to temperatures above about 1400° C., and also above that at which the coke begins to puff in the absence of the puffing inhibitor and preferably above 2000° C. The puffing inhibitor may be introduced by dusting fine powders of the inhibitor onto the granular petroleum coke or an aqueous slurry containing the inhibitor may be prepared and sprayed onto the coke before heating the coke particles to puffing temperatures. The coke particles are then cooled to about ambient temperatures and blended with a pitch binder to form a conventional carbonaceous mix. The puffing inhibitor combines with the sulfur and is volatilized when the coke is heated to puffing temperatures and above. The problem with this approach is that the process requires heating the coke particles to temperatures that are significantly higher than those ordinarily employed during the usual calcining process. Consequently, this treatment can only be carried out with a process which is different from ordinary calcining practices, consuming more energy and requiring more expensive equipment.

SUMMARY OF THE INVENTION

The present invention is directed to an improved process for treating high sulfur petroleum coke with a puffing inhibitor prior to incorporating the coke into a carbonaceous mix. In the broadest sense, the improved process comprises contacting the particles of the high sulfur petroleum coke with a compound containing an alkali or alkaline earth metal selected from the group consisting of sodium, potassium, calcium and magnesium, at an elevated temperature above that at which the alkali or alkaline earth metal compound begins to react with carbon, but below the temperature at which the coke particles would begin to puff in the absence of the compound; maintaining the coke particles at the elevated temperature for a sufficient period to time to permit the reaction to proceed and allow products of reaction to penetrate the particles and form an alkali or alkaline earth metal containing deposit throughout the mass of the particles; and then cooling the so-treated coke particles.

The process of the present invention is preferably carried out at an elevated temperature between about 1200° C. and 1400° C. However, it has been found that temperatures as low as 750° C. are adequate to promote the required reaction between the puffing inhibitor and coke particles and can be employed.

The puffing inhibitor used in the process of the present invention may be a salt of the alkali or alkaline earth metal, and preferably is sodium carbonate. The inhibitor may be admixed with the petroleum coke particles before or after heating during the usual calcining process, and may be incorporated with the coke particles in the form of dry, granulated powders or as a solution containing the inhibitor which can be sprayed onto the particles. The inhibitor is employed in amounts greater than about 0.2 percent by weight of the coke.

In a preferred embodiment of the present invention, the improved process for treating high sulfur petroleum coke particles comprises:

calcining the high sulfur petroleum coke particles;

adding sodium carbonate to the calcined coke particles at an elevated temperature above about 1200° C. but below the temperature at which the coke particles would begin to puff in the absence of the sodium carbonate;

maintaining the calcined coke particles and sodium carbonate at the elevated temperature for a sufficient period of time to permit the sodium carbonate to react with the coke and to allow the resulting sodium to penetrate the particles and deposit sodium throughout the mass of the particles; and cooling the so-treated coke particles.

In another aspect of the present invention, a carbonaceous filler or aggregate is provided for use in the production of carbon or graphite articles which comprises discrete particles of petroleum coke having a high sulfur content and having a puffing inhibiting agent distributed throughout the mass of the particles. The puffing inhibiting agent comprises a water-insoluble compound of an alkali or alkaline earth metal selected from the group consisting of sodium, potassium, calcium and magnesium; the average amount of the metal in the particles being greater than about 0.15 percent by weight.

BRIEF DESCRIPTION OF THE DRAWINGS

In the accompanying drawings:

FIGS. 7, 8 and 9 are graphs showing the puffing rates of several different types of petroleum cokes according to the present invention;

DESCRIPTION OF THE PREFERRED EMBODIMENTS

Figure 1:
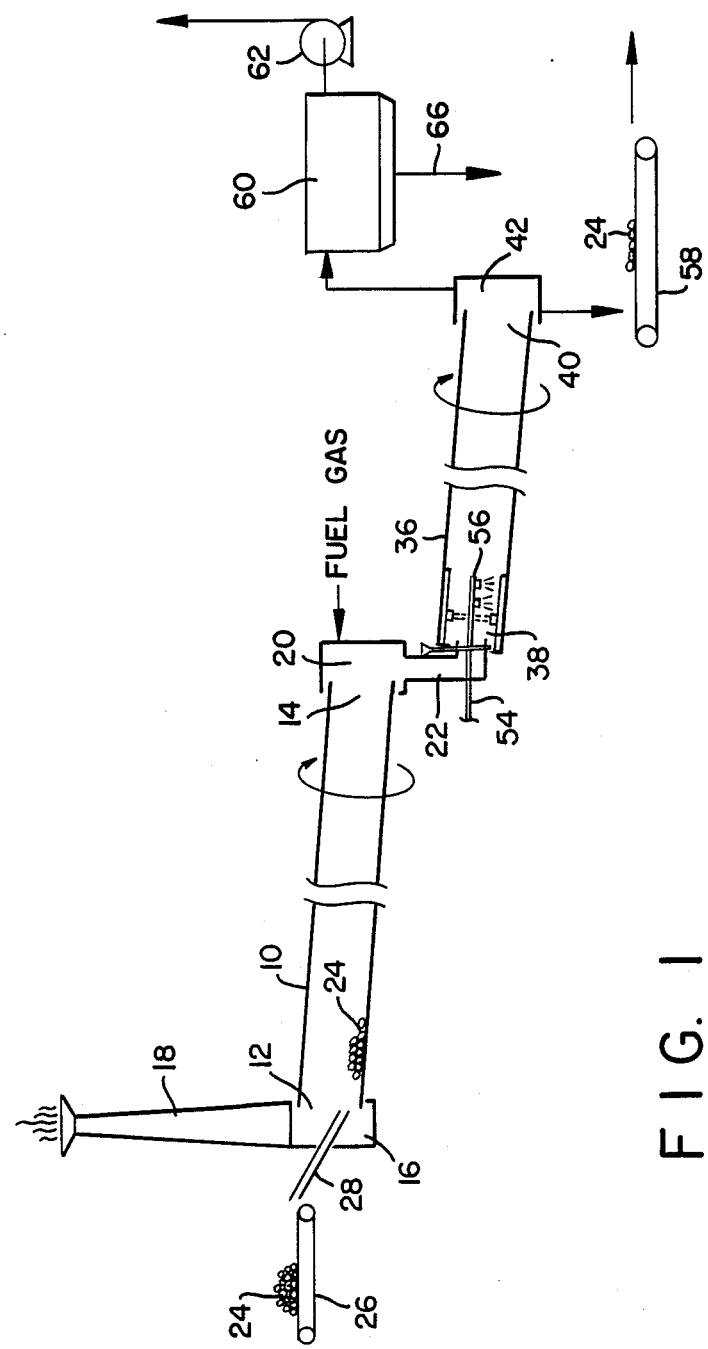
FIG. 1 is a schematic elevational view of a calcining apparatus which has been modified to carry out the process of the present invention.

Petroleum coke is produced by coking heavy petroleum residues, as is well known in the prior art. Raw petroleum coke, that is, petroleum coke that has not been calcined, usually has a volatile matter content of between about 6 and 14 percent. The volatile matter is typically removed by heating the raw petroleum coke in a calciner to temperatures of between about 1200° C. and about 1400° C. Occasionally, calcining temperatures as high as 1500° C. may be employed. The volatile matter content of a coke after calcination is usually less than about one percent by weight. Raw petroleum coke is ordinarily reduced in size to particles 4" or less prior to calcining.

For purposes of the present invention, the starting coke material may be either a raw petroleum coke or a petroleum coke that has been calcined by conventional methods. In either case, the petroleum cokes to which the present invention is particularly directed are the so called "high sulfur" petroleum cokes which ordinarily contain more than about 0.7 percent by weight sulfur. These high sulfur petroleum cokes ordinarily cannot be adequately controlled by puffing inhibition methods that are presently known in the art. Although these cokes cost less, their use for production of carbon or graphite articles is either limited or requires modified, more expensive processing technology.

Sulfur is released from its chemical bond with carbon when a petroleum coke is heated to temperatures higher than about 1500° C., and in most cases to at least about 1600° C., which is higher than ordinary calcining temperatures. If this release of sulfur is not inhibited or the sulfur is not tied up chemically inside the coke structure, then the rapid escape of sulfur-containing vapors will create internal pressure in the coke particles which tends to expands the particles, sometimes even splitting them or splitting the articles made therefrom. This phenomenon is called puffing.

It has been discovered in accordance with the present invention that puffing of the formed carbon or graphite article can be significantly reduced or eliminated by treating the petroleum coke particles with an alkali or alkaline earth metal compound and especially a salt of sodium or potassium, such as sodium or potassium carbonate, at temperatures which are well below the temperature at which the coke begins to puff, prior to incorporating the coke particles into a carbonaceous mix. From the literature, "Effect of Sodium Carbonate upon Gasification of Carbon and Production of Producer Gas," by D. A. Fox et al, Industrial and Engineering Chemistry, Vol. 23, No. 3, March 1931, it is known that an alkali metal compound (e.g. sodium carbonate) can be effectively reduced with carbon in a high-temperature reactor to produce alkali metal vapors and carbon monoxide. It has been surprisingly found according to the invention that if the alkali or alkaline earth metal compound is allowed to stand in contact with the petroleum coke particles for a sufficiently long period of time, e.g. about one minute or more, while maintaining the temperature above that at which this reduction reaction occurs, e.g. about 750° C. in the case of sodium carbonate, then the alkali or alkaline earth metal, so produced, will penetrate and form an alkali or alkaline earth metal containing deposit throughout the mass of the coke particles not just into their pores. A residence time of 30 seconds has been shown in the laboratory to be effective for suppression of puffing. In production scale trials the residence time at the reaction temperature was maintained longer than one minute.

It has been known for some time that sodium carbonate, when used as an inhibitor in the conventional way, adding to the coke-pitch mix, causes the product to have a lower density and a lower strength compared to the same product made with the conventional puffing inhibitor; i.e. iron oxide. We found that sodium carbonate, when used as a puffing inhibitor in accordance with this invention, did not cause a loss of either density or strength in the product and yielded a product equal to that produced using iron oxide as the puffing inhibitor.

Since the inhibiting agent is deposited inside the coke particle, it has no contact with the pitch during processing of the carbonaceous mix and does not interfere with any extrusion aids such as fatty acids.

Although the alkali or alkaline earth metal compound may be placed in contact with the petroleum coke particles either before or after heating the coke particles to the required temperatures for carrying out the reaction, it is highly advantageous to add the inhibitor compound to the coke particles in the form of dry, granulated powder after the coke particles have been heated to calcining temperatures between about 1200° C. and about 1400° C. In actual practice, the dry, granulated powder of inhibitor compound is added to the calcined coke particles at the discharge end of the calciner. It is also possible to add the inhibitor compound to the raw coke in the form of dry powder or to spray the coke with a solution or slurry containing the inhibitor prior to calcination.

The alkali or alkaline earth metal compound, e.g. sodium carbonate, is admixed with the petroleum coke particles in amounts greater than about 0.2 percent by weight. Preferably, the inhibitor is used in amounts ranging from about 0.5 to about 2.5 percent by weight of the coke.

Figure 2:
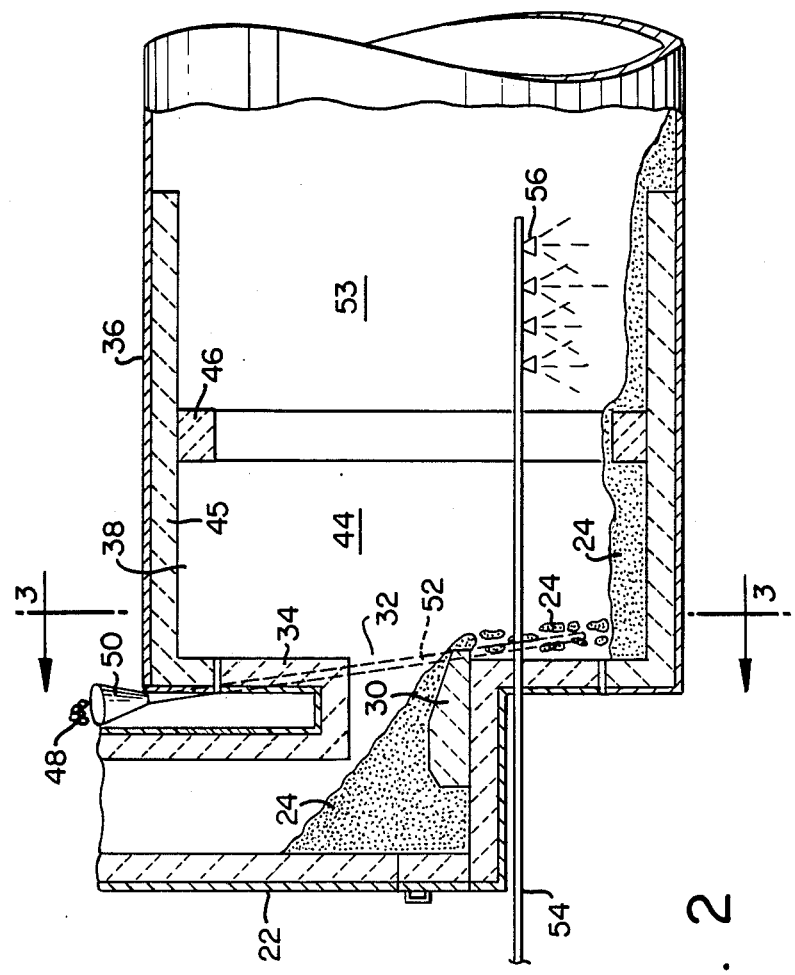
FIG. 2 is an enlarged sectional view of the modified portion of the apparatus shown in FIG. 1.
Figure 3:
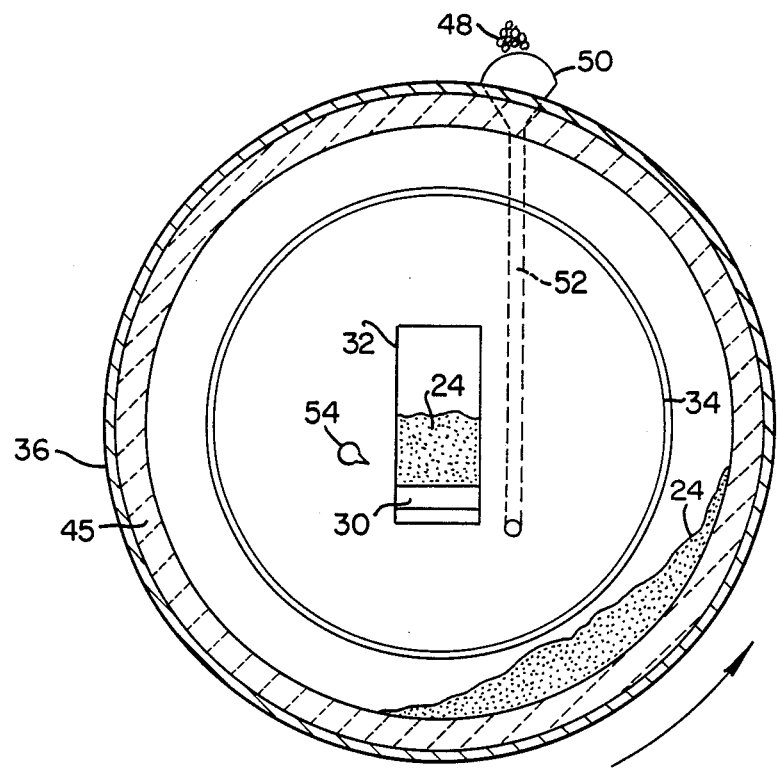
FIG. 3 is a sectional view of the modified calcining apparatus taken along the line 3—3 in FIG. 2.

In FIGS. 1–3 of the drawing, there is shown a typical rotary type calcining apparatus which has been modified in order to carry out the improved process of the present invention. As shown, the calcining apparatus includes an elongated, cylindrical, rotary calcining kiln 10 having an inlet end 12 and an outlet end 14. The inlet end 12 of the calcining kiln 10 is mounted for rotation within a stationary coke entrance chamber 16 having a vertical stack or chimney 18 for the escape of flue gases from inside the calciner. The outlet end 14 of the calcining kiln 10 is similarly mounted for rotation within a stationary coke discharge chamber 20 including a conventional clinker box 22 disposed vertically below the chamber 20.

Raw petroleum coke particles 24 are supplied to the calcining apparatus via a horizontal conveyor 26 and are fed down a coke chute 28 into the inlet end 12 of the rotary calcining kiln 10. As shown in the drawing, the kiln 10 is inclined at a small angle along its longitudinal axis from its inlet end 12 down to its outlet end 14. Thus, as the coke particles 24 enter the kiln 10, they are forced by gravity to move slowly along the length of the kiln 10 as it rotates until they reach the outlet end 14 from whence they are discharged to the chamber 20.

A fuel, such as natural gas, is burned at the hot end of the kiln and the combustion gas passes through the kiln 10 counter-currently to the flow of coke particles 24. The hot combustion gases heat the coke particles 24 and cause the volatiles contained therein to vaporize and burn.

The hot calcined coke particles 24 drop from the chamber 20 into the clinker box 22 where they flow over the refractory block 30 (FIG. 2). The block 30 is located in the bottom of a rectangular outlet opening 32 provided in the stationary head 34 of the cooler 36.

An elongated, cylindrical, rotary cooler 36 is positioned beneath the discharge chamber 20. The cooler 36 has an inlet end 38 which is mounted for rotation around the stationary head 34 of the clinker box 22. The outlet end 40 of the cooler 36 is mounted for rotation within a stationary coke delivery chamber 42.

The elongated, cylindrical, cooler 36 is also inclined downwardly at a slight angle from its inlet end 38 to its outlet end 40. As shown in FIG. 2, the hot calcined coke particles 24 collect in a body at the bottom of the clinker box 22 behind the refractory block 30 and eventually spill over the edge of the block 30 and fall into the inlet end 38 of the rotary cooler 36. The coke particles are then forced by gravity and rotation of the cooler to move slowly down the length of the cooler 36 until they reach the outlet end 40 from whence the particles enter and collect within the coke supply chamber 42.

Although some calciners may employ indirect cooling, e.g. through the steel shell of the cooler 36, most calciners quench the hot, calcined coke directly by spraying it with water. This direct spraying reduces the temperature of the hot coke particles immediately after they leave the clinker box 22. Typically, in order to accomplish this purpose, a series of nozzles are provided just below the outlet opening 32 of the clinker box 22.

As shown in FIG. 2, a conventional calcining apparatus can be modified to carry out the process of the present invention by incorporating a hot zone 44 inside the inlet end 38 of the cooler 36. The hot zone is formed in accordance with the present invention by locating a circulr refractory ring 46 a predetermined distance down stream from the clinker box outlet 32 and by moving the quench-water spray nezzles 56 downstream of the refractory ring 46. As shown, the ring 46 is mounted against the refractory lining 45 which is placed adjacent to the interior cylindrical side walls of the cooler 36. The refractory retention ring 46 increases the depth of the coke layer in the hot zone 44 and thereby increases the coke residence time. The temperature of the coke particles 24 as they enter the hot zone 44 is somewhat reduced by the process reaction but remains above 1100° C.

Dry, granulated powder 48 of sodium carbonate is fed into the hot zone 44 through a funnel 50. The funnel 50 has an elongated, tubular stem 52 which extends through the side wall 34 of clinker box 22 and deposits the powder on top of the layer of hot calcined coke particles 24 at the bottom of the hot zone 44. As best shown in FIG. 3, the powder is mixed with the coke particles 24 by the tumbling action occurring inside the rotating cooler 36. The powdered sodium carbonate melts upon contact with the hot coke particles 24 and reacts with the coke according to the following endothermic reaction:

$$Na_2CO_3(l) + 2C(s) = 2Na(g) + 3CO(g)$$

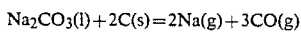

$\Delta H = 213$ kcal/mol - - - at 1330° C.

(l), (s), and (g) refer to the physical state of the reactants, i.e. liquid, solid and gaseous, respectively. The elemental sodium produced by the above reaction penetrates the coke particles and is distributed throughout the mass of the coke particles creating a modified coke containing sulfur and sodium.

After treatment with the sodium carbonate powders in the hot zone 44 for a sufficient period of time the hot calcined coke particles 24 eventually flow over the refractory ring 46 and into the cooling section 53 of the cooler 36.

In this modified version of the cooler 36, a pipe 54 carrying quenching water to a series of nozzles 56 at its outer end, is mounted in the usual manner within the lower portion of the side wall 34 of clinker box 22 but in this case the pipe 54 is made longer so as to extend completely through the hot zone 44 and into the cooling section 53. Thus the water is sprayed from the nozzles 56 directly onto the hot coke particles as they leave the hot zone 44 to quench the particles and significantly reduce their temperature.

The quenched or cooled, treated, calcined coke particles are then discharged from the chamber 42 onto a moving conveyor 58 which transports the coke particles to a storage area. Steam, produced in the cooler from the quenching water, is removed from the cooler together with some air by a fan 62 and blown to atmosphere. The steam/air mixture passes through a dust collector 60 where coke dust is trapped to prevent air pollution.

Figure 4:
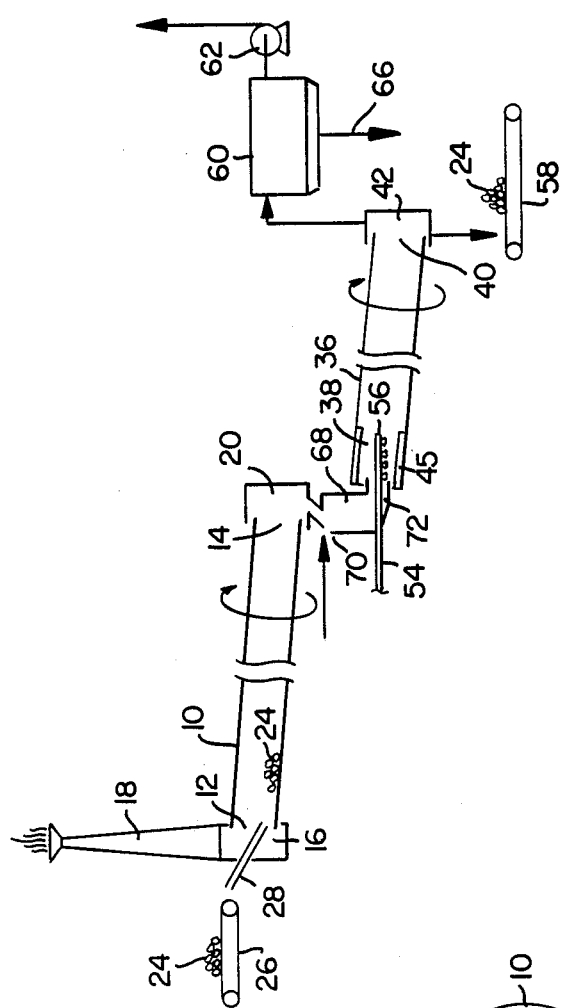
FIG. 4 is a schematic elevational view of a calcining apparatus according to another embodiment of the present invention.
Figure 5:
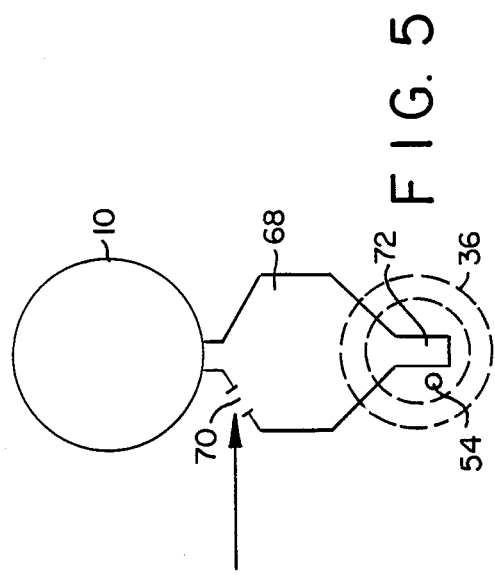
FIG. 5 is an enlarged side elevational view of the calcining apparatus shown in FIG. 4.

FIGS. 4 and 5 show a calcining apparatus which is constructed specifically for use in treating petroleum coke according to the present invention. This calcining apparatus is equipped with a retention chamber comprising a separate reactor vessel 68. This reactor vessel is located downstream from the calciner and upstream from the cooler and can be designed for a long residence time. Calcined coke particles are fed from the discharge chamber 20 to the reactor vessel 68 where they are treated with dry, granular powders of the alkali or alkaline earth metal compound, e.g., sodium carbonate, which is supplied simultaneously through the inlet 70. After treatment, the hot coke particles pass out through the outlet 72 in reactor vessel 68 and enter the inlet end 38 of the rotary cooler 36.

It will be seen from the foregoing that the process of the present invention can be practiced either in an existing facility using a conventional calcining apparatus or in a new facility employing a calcining apparatus provided with a separate reactor according to the present invention.

An important advantage which is obtained by adding the inhibitor e.g. sodium carbonate, to the calcined petroleum coke particles in a separate reaction vessel located at the discharge end of the calcining kiln is that no gas flows through this vessel and hence there is virtually no opportunity for the inhibitor to be carried away and released to the atmosphere.

A number of laboratory experiments were conducted to determine the amount of sodium carbonate required in the present process for effective suppression of puffing and also the minimum residence time in the case of four different petroleum cokes having different sulfur contents. In these experiments, one kilogram of calcined coke particles was placed into an open-top graphite container and inserted into a muffle furnace preheated to about 1200° C. When the coke temperature (measured by a thermocouple in the coke) reached 1200° C., the furnace door was opened and a predetermined amount of sodium carbonate, e.g. 0.4%, 0.8%, 1.2%, 1.6%, etc., was dropped on the coke surface using a long graphite tool. The coke sample was then raked briefly. At a predetermined time, the graphite container was pulled out of the furnace and the coke quenched by spraying water on it and raking it at the same time. The time required to reduce the coke temperature to between 300° C. and 500° C. ranged from about 30 seconds to about 90 seconds.

The experimental reaction time reported was counted from the moment of dropping the inhibitor onto the coke to the moment when the water-quenching was started. The quenched coke was allowed to cool to ambient temperature without further water spraying. The cooled coke samples were then tested for puffing, i.e., the irreversible expansion occurring in sulfur-containing cokes when heated to between about 1600° C. and 2200° C.

Puffing was measured on a specimen prepared from the coke and placed in a dilatometer assembly made from a low-expansion graphite. The assembly, containing the specimen, was placed in a tube furnace and heated at 450° C. per hour to 2400° C. After the temperature had reached 1000° C., the differential expansion of the specimen over that of the graphite container was recorded at 15 minute intervals.

Several different values can be derived from these measurement, i.e., (1) the total expansion over the temperature range; (2) the puffing rate per unit of time as a function of temperature; and (3) the temperature at which the puffing rate reaches a maximum.

FIGS. 6 through 9 show relationships between the highest puffing grate and the amount of inhibitor used. The unit of puffing rate in those figures is $10^{-4}$ m/m per 15 minutes at a heating rate of 450° C. per hour. The temperature at which the puffing rate of these particular cokes attained its highest value was at about 1750° C.

Figure 6:
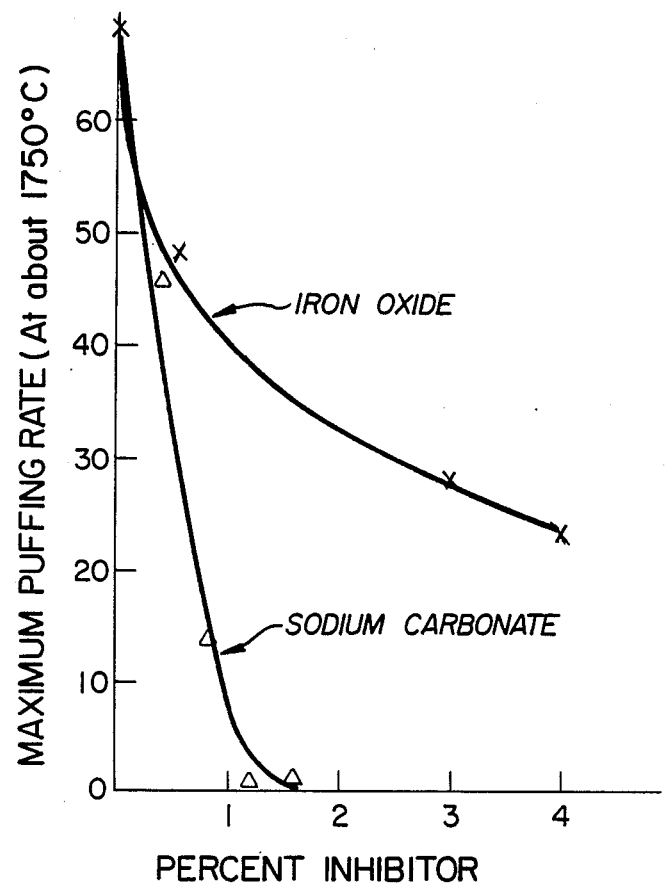
FIG. 6 is a graph showing the puffing rates of petroleum coke treated with a conventional inhibitor and the same coke treated according to the present invention.
Figure 7:
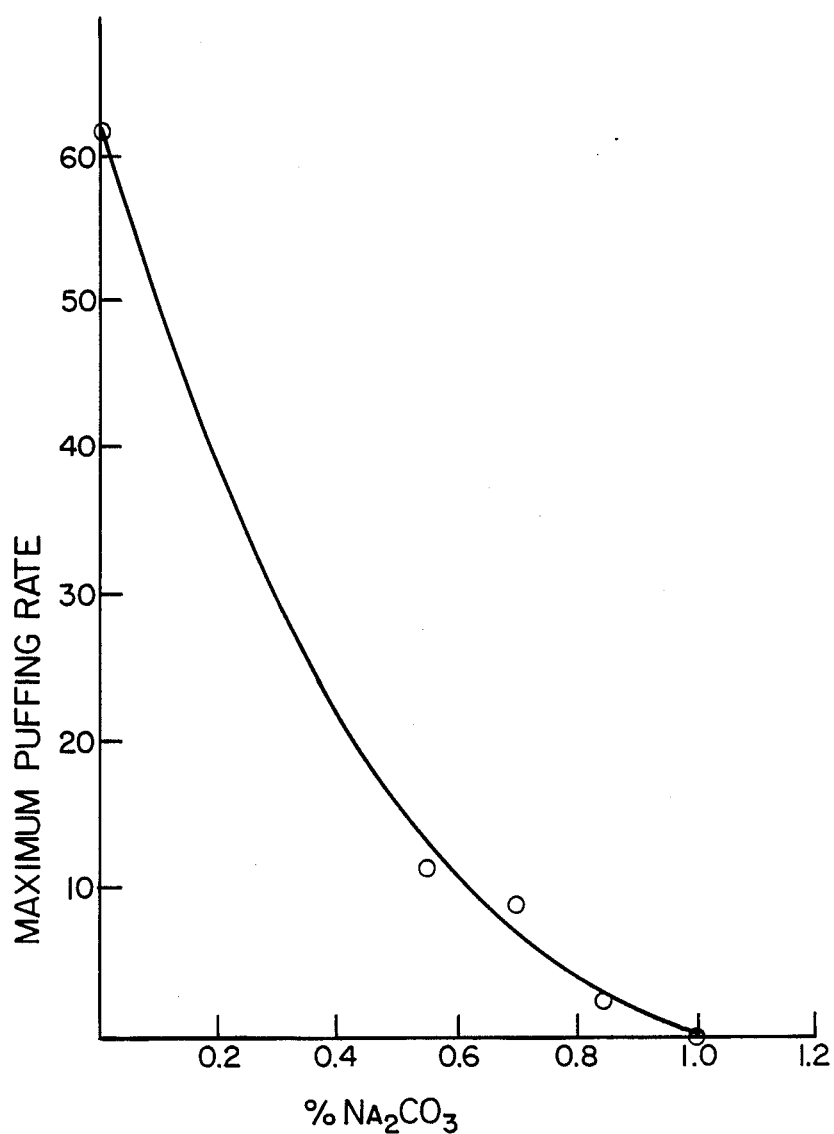
Figure 9:
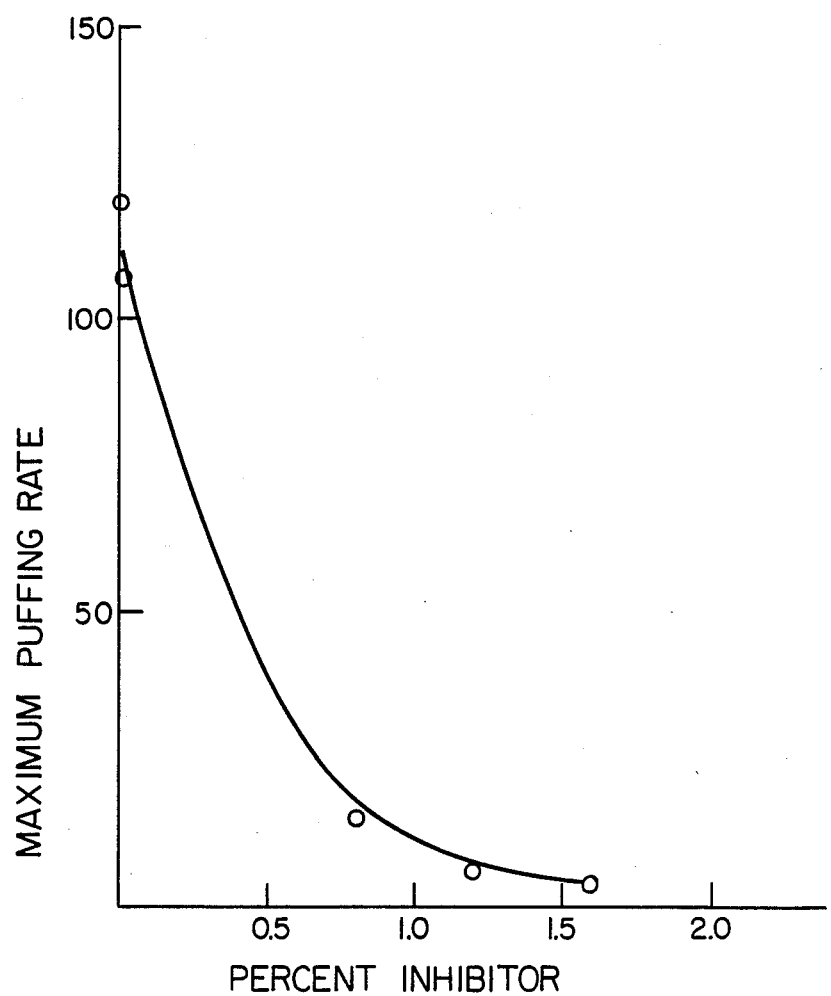

FIG. 6 is a graph showing the relationship between the maximum puffing rate as determined in the above experiment and the amount of inhibitor used. Curve A shows this relationship in the case of a needle coke, coke $D^1$, containing 1.05 percent by weight sulfur and using different amounts of sodium carbonate as the inhibitor. A puffing rate of about ten is the desired limit for processing the coke into graphite electrodes by modern graphitization methods. It will be seen from Curve A that this permissible puffing rate is achieved with only one percent by weight of the sodium carbonate inhibitor.

1. The coke designations D-G are used merely for purposes of identification herein and have no relation to standard coke designations employed in the industry.

For purposes of comparison, the same experiment described above was repeated with the same needle coke having the same sulfur content but using a conventional inhibitor, iron oxide. Curve B in FIG. 6 shows the results of this experiment. It will be seen that the puffing suppression in the case of the conventional inhibitor was far inferior to that obtained with the same coke treated with sodium carbonate according to the present invention. The iron oxide, even when used at twice the conventional concentration (4 weight percent instead of 2 weight percent), did not attain a comparable reduction in the puffing of this particular coke.

The same type of experimental test was conducted on a regular grade petroleum coke, coke $E^1$, containing 1.3 percent by weight sulfur. In this test, the coke was treated according to the process of the present invention using sodium carbonate as the inhibitor and a residence time of about one minute. The results of this test are represented by the curve in FIG. 7. It will be seen that an adequate puffing rate reduction is achieved when using only about 0.6 weight percent of the sodium carbonate inhibitor.

A similar experimental test was conducted on another calcined petroleum needle coke, coke $F^1$, containing about 1.3 weight percent sulfur using sodium carbonate as the inhibitor and a residence time of about one minute. The results of this test are represented by the curve in FIG. 8. It will be seen that this particular coke required about 1.3 weight percent of the sodium carbonate inhibitor in order to suppress puffing below the permissible level.

Another experimental test was conducted on another needle coke, coke $G^1$, contaning 1.1 weight percent sulfur again using sodium carbonate as the inhibitor and a residence time of about one minute. The results of this test are represented by the curve in FIG. 9. It will be seen that in this case about 1.2 weight percent of the sodium carbonate inhibitor was required in order to suppress the puffing below the permissible puffing rate. The same type of coke, coke $G^1$, required about 1.6 weight percent of the sodium carbonate inhibitor when its sulfur content increased to about 1.25 weight percent sulfur.

A number of large scale experimental trials have also been conducted using a modified calcining apparatus as substantially shown in FIGS. 1-3 wherein several hundred tons of three different regular and needle cokes containing about one weight percent or more of sulfur were calcined and treated according to the process of the present invention. In these trials, approximately one weight percent of sodium carbonate powder of a size smaller than 800 microns wase added to the calcined coke in a hot zone constructed inside the inlet end of the cooling drum while at temperatures of between 1200° C. and 1350° C. and for a period of at least one minute. The calcined and treated coke was then cooled and samples were taken and subjected to the same type of test as described above to determine the puffing rate. It was found that puffing of these particular cokes had been reduced sufficiently for rapid lengthwise graphitization. It was also unexpectedly found that the present process reduced substantially the amount of chemicals, e.g., chlorides, sulfates, etc., that are normally released to the atmosphere in the cooler off-gas during calcination. Moreover, since the process also eliminates the acidity of the cooler off-gas, the potential for equipment corrosion is substantially reduced.

Graphite electric furnace electrodes measuring 20 inches in diameter and 96 inches in length were made using one of the high sulfur petroleum needle cokes calcined and treated in the above described experimental trials. The calcined and treated coke was used as an aggregate or filler and mixed with a pitch binder and the usual extrusion aids to form a carbonaceous mix. The mix was then extruded, baked at about 800° C. and then graphitized to temperatures of about 3000° C. There were no processing problems during extrusion and baking and there was no evidence of any puffing problems. The electrodes were subsequently tested experimentally on an electric-arc steel furnace and performed comparably to electrodes made from more expensive, low-puffing premium needle cokes.

Particles of a regular grade coke, coke $E^1$, containing an average 1.28 percent sulfur, were treated in accordance with this invention with varying proportions of sodium carbonate ranging from 0.25 percent to 1 percent. The treated particles were then tested, using routine analytical methods, for contents of sulfur, sodium, and ash, and were tested for puffing. The resulting are assembled in Table 1. The data shows (1) that addition of 0.55% sodium carbonate reduced the puffing of this coke to an acceptable level, while 0.25% did not; (2) that the sodium content in the coke was proportional to the amount of sodium carbonate added during the treatment within experimental error, and (3) that 0.18% sodium content, corresponding to 0.55% of $Na_2CO_3$ added, reduced the puffing of this particular coke to an acceptable level, while 0.12% sodium in the coke was not sufficient.

TABLE I

| Sample No. | % Na₂CO₃ Added | Puffing Rate | % Ash in Coke | % Na in Coke |
|---|---|---|---|---|
| Control | 0 | 62.0 | | |
| 1 | 1 | 0 | 1.88 | 0.36 |
| 2 | 0.85 | 2.3 | 1.22 | 0.26 |
| 3 | 0.7 | 8.7 | 1.0 | 0.24 |
| 4 | 0.55 | 11.3 | 0.76 | 0.18 |
| 5 | 0.25 | 41.0 | 0.68 | 0.12 |

Penetration of sodium into the body of the particles, treated in accordance with this invention, was examined by a Scanning Electron Microscope using an Energy-Dispersive X-ray Method (SEM-EDX). The particles were mounted in epoxy and ground to mid-level to expose an internal plane and also leave a natural pore surface.

Figure 10A:
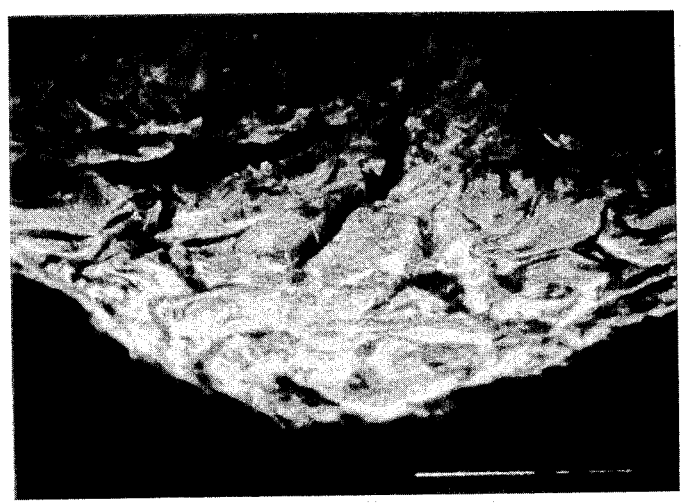
FIG. 10a is a photomicrograph taken with a Scanning Electron Microscope (SEM) at a magnification of 200X and showing an area near the edge of an internal plane prepared by grinding a half-inch coke particle treated according to the present invention.
Figure 10B:
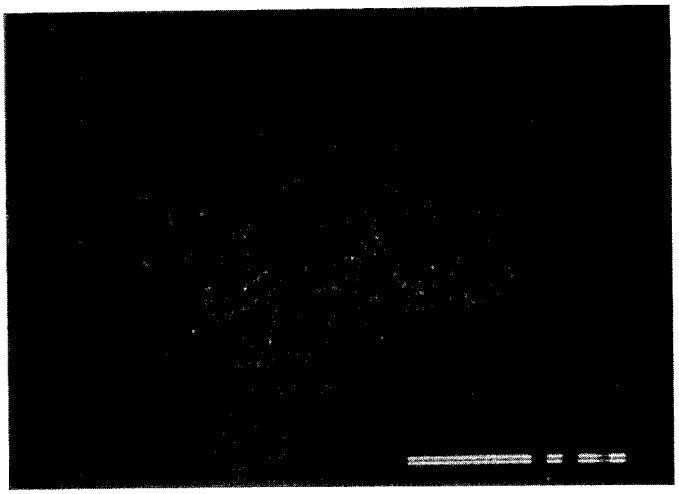
FIG. 10b is a photomicrograph of the same area shown in FIG. 10a but showing the sodium X-ray elemental map obtained by Energy Dispersive X-ray analysis (EDX), also at 200X magnification.
Figure 10C:
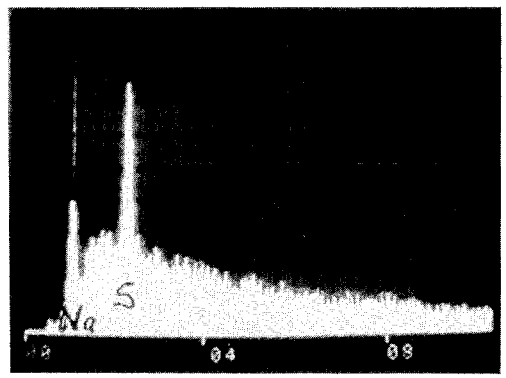
FIG. 10c is a photomicrograph of the EDX spectrum of the same area shown in FIGS. 10a and 10b.
Figure 11C:
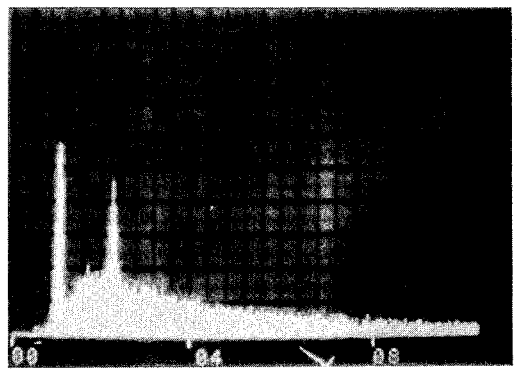
FIG. 11c is a photograph of the EDX spectrum of the same area shown in FIGS. 11a and 11b.
Figure 11A:
FIG. 11a is a photomicrograph taken with a Scanning Electron Microscope (SEM) at a magnification of 45X and showing another area, closer to the center of the same internal plane shown in FIGS. 10a and 10b.
Figure 11B:
FIG. 11b is a photomicrograph of the same area shown in FIG. 11a but showing the sodium X-ray elemental map obtained by EDX analysis, also at 45X magnification.
Figure 12A:
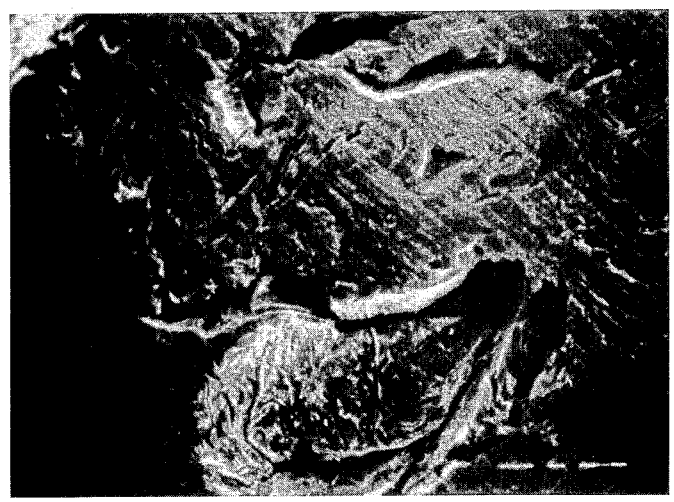
FIG. 12a is a photomicrograph taken with a SEM at 50X magnification and showing a third area of the same internal plane shown in FIG. 10a and 10b.
Figure 12B:
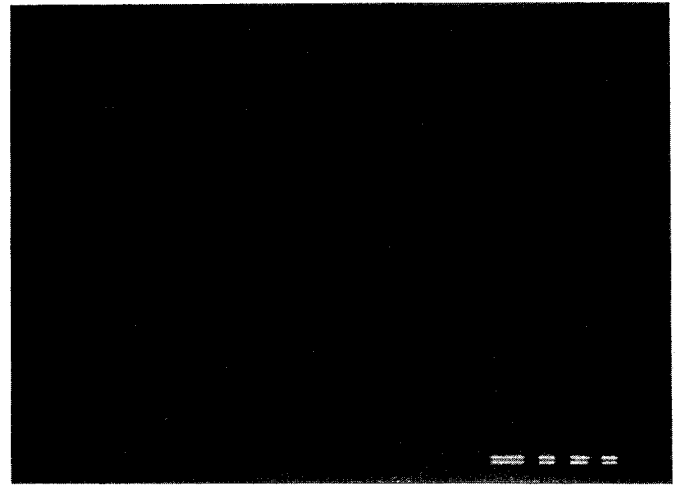
FIG. 12b is a photomicrograph of the same area shown in FIG. 12a but showing the sodium X-ray elemental map obtained by EDX analysis at the same 50X magnification.
Figure 12C:
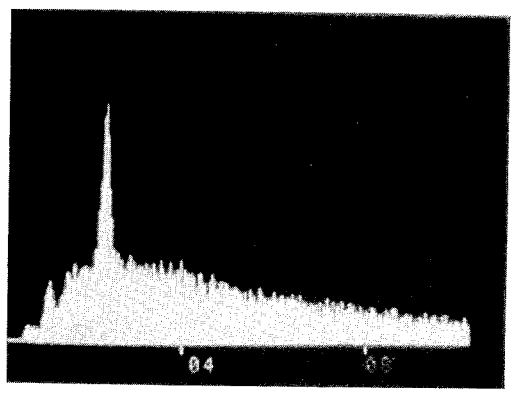
FIG. 12c is a photograph of the EDX spectrum of the same area shown in FIGS. 12a and 12b.
Figure 13C:
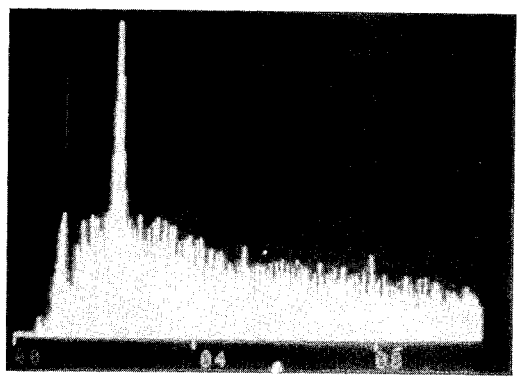
FIG. 13c is a photograph of the EDX spectrum of the same area shown in FIGS. 12a and 12b.
Figure 13A:
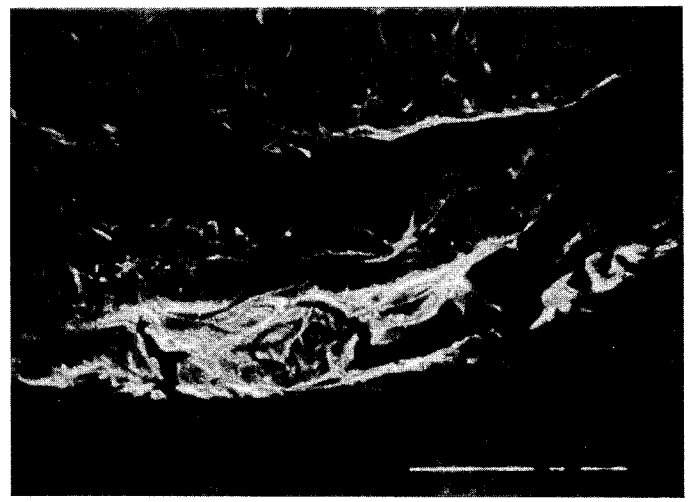
FIG. 13a is a photomicrograph taken with a SEM at 200X magnification and showing a fourth area of the same internal plane shown in FIGS. 10a and 10b.
Figure 13B:
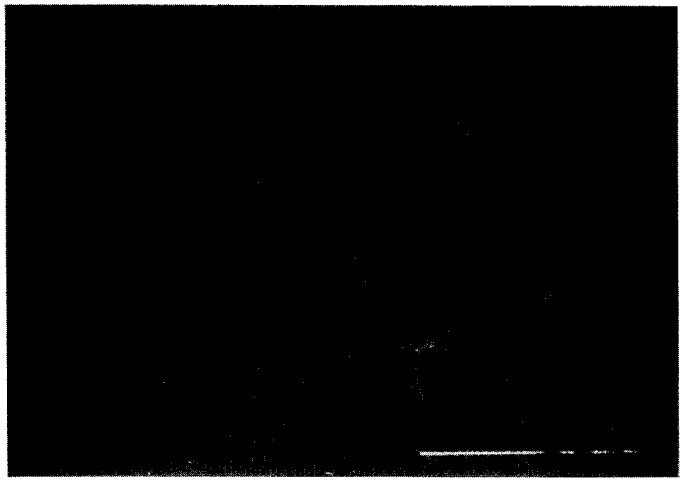
FIG. 13b is a photomicrograph of the same area shown in FIGS. 13a but showing the sodium X-ray elemental map obtained by EDX analysis at the same 200X magnification.

In FIGS. 10a–13a, inclusive, there are shown a series of photomicrographs taken at different magnifications (i.e., 200X, 45X, 50X and 200X, respectively), and showing SEM images of three areas of an internal plane produced by grinding a quarter-inch coke particle. The area shown in FIG. 10a is near the edge of the internal plane, the area shown in FIG. 11a is close to the center of the plane, and the area shown in FIG. 12a is in the center of the ground plane. The fourth area shown in FIG. 13a is also close to the center of the plane, similar to the area shown in FIG. 11a.

The location and distribution of sodium at the internal plane is shown in the photomicrographs in FIGS. 10b–13b, inclusive. The photomicrographs were produced at the same magnifications indicated above by EDX analysis for sodium using a Scanning Electron Microscope.

It will be seen from the fairly uniform distribution of bright dots throughout the photomicrographs, each of which represents a different area in the same internal plane of the coke particle, that sodium does in fact penetrate deep inside each particle treated according to the process of the present invention and that the distribution of sodium throughout the mass of each individual coke particle is substantially uniform. The concentration of sodium may vary from one particle to another but inside of an individual particle, the concentration is essentially uniform. It should be understood that the sodium produced by the reaction between sodium carbonate and coke forms, after diffusion into the mass of the coke particles, a compound that is not soluble in water and is not reactive with water, and that the sodium is present as a sodium containing compound rather than as elemental sodium. The exact composition of the sodium containing compound is not clearly understood at this time.

A series of energy spectrum charts taken at the ground internal surfaces of each zone of the coke particles examined in these tests are shown in FIGS. 10c–13c, inclusive. It will be seen from the charts that the intensity of two peaks predominate in the energy spectrum and that these peaks are located at the same two positions corresponding to both sodium and sulfur, thus confirming the presence of these two elements in the coke particles. Moreover, since a peak for sodium occurs in each chart representing a different zone of the coke particle, it can be concluded that sodium is actually deposited substantially uniformly throughout the mass or body of the coke particles treated according to the present invention.

Figure 14A:
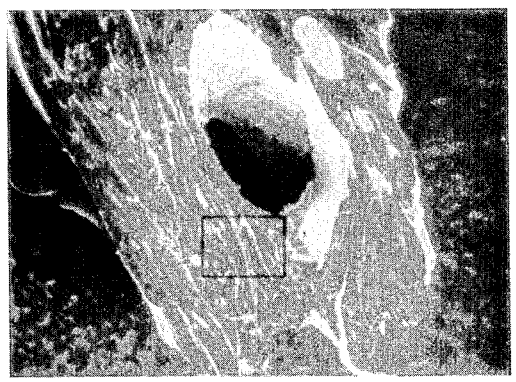
FIG. 14a is a photomicrograph taken with a SEM at a 15X magnification and showing both an internal plane prepared by grinding a quarter-inch coke partical treated according to the present invention and also showing an original pore surface exposed by grinding.
Figure 14B:
FIG. 14b is a photomicrograph of the same area shown in FIG. 14a but showing the sodium X-ray elemental map obtained by EDX analysis at the same 15X magnification.
Figure 15C:
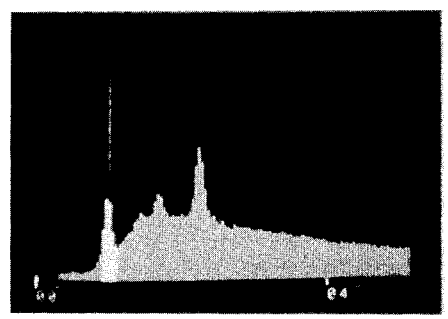
FIG. 15c is a photograph of the EDX spectrum of the same areas shown in FIGS. 15a and 15b.
Figure 14C:
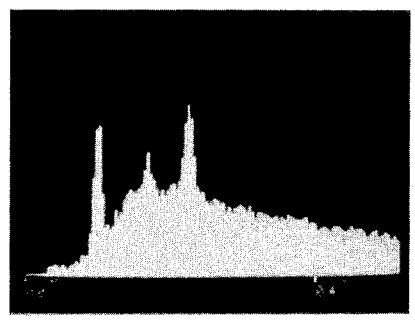
FIG. 14c is a photograph of the EDX spectrum of the same area shown in FIGS. 14a and 14b.
Figure 15A:
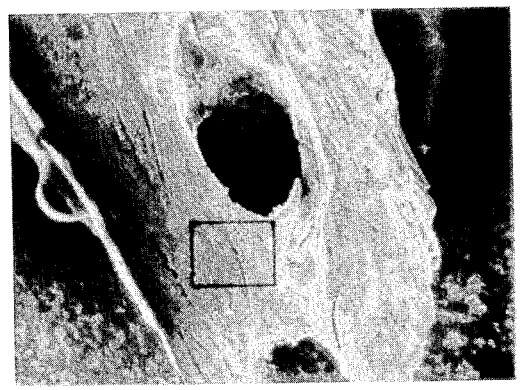
FIG. 15a is a photomicrograph taken with a SEM at 15X magnification of the same surfaces shown in FIG. 14a but taken after the particle had been leached with water.
Figure 15B:
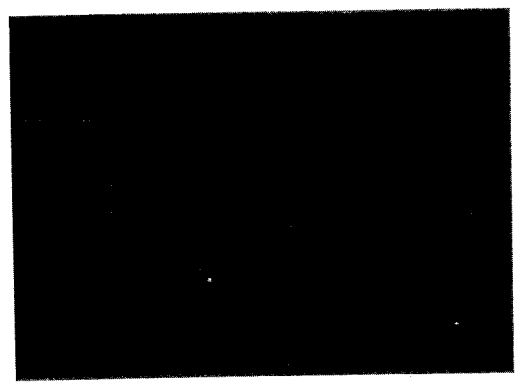
FIG. 15b is a photomicrograph of the same areas shown in FIG. 14a but showing the sodium X-ray elemental map obtained by EDX analysis at the same 15X magnification.

Still another study of sodium penetration and of its solubility after the reaction with coke has been carried out with particles of Coke F¹, 0.12 inches to 0.25 inches in size, which were treated with 20 percent sodium carbonate at about 1200° C. in accordance with the present invention. One of these treated particles was mounted and ground to expose both an internal plane and an original pore surface. This particle was examined with the same SEM-EDX methods as the particle shown in FIGS. 10a through 13a. After the examination, the particle was leached with water to remove any water soluble compounds, and then it was again examined using the same techniques. FIGS. 14a, 14b and 14c show the examinations before leaching, while FIGS. 15a, 15b and 15c show the examinations after leaching. FIG. 14b demonstrates that the sodium was distributed essentialy uniformly at the ground internal plane and also substantially uniformly, but at a much higher concentration, on the exposed original surface of the pore. FIG. 15b shows that after leaching, the penetration and distribution of the sodium at the internal plane remained essentially unchanged, but the sodium concentration on the original pore surface was reduced to approximately the same level as on the internal plane and its distribution was essentially uniform.

It is believed that the insoluble sodium, observed in the above study, is the product of the interaction between sodium and coke, while the water-soluble sodium, found only on the original surface but not inside the body of the particle, is unreacted sodium carbonate.

Analyses of the water-extract by standard analytical methods confirmed the presence of sodium carbonate. The presence of unreacted sodium carbonate on the surface of the treated particles indicates that, under some reaction conditions, the reaction between sodium carbonate and coke did not proceed to completion.

Thus, the present invention provides an improved method for treating calcined petroleum coke in order to reduce or eliminate puffing wherein the coke particles are heated in the presence of an alkali or alkaline earth metal compound, preferably sodium carbonate, at temperatures of above about 750° C. and preferably between about 1200° C. and 1400° C. The inhibitor should be maintained in contact with the coke particles for a sufficiently long period of time e.g., one minute or more, to allow the inhibitor to react with the carbon and to allow products of the reaction to penetrate deeply into the mass of the coke particles. Although it is possible to add the inhibitor directly to the raw coke prior to heating or calcining, it is preferred to add the inhibitor immediately after the coke particles have been discharged from the calciner. This avoids possible environmental problems and also has the advantage of reducing the off-gas acidity, as explained hereinabove.

The present invention further provides an improved method for producing carbon and graphite particles such as electric furnace electrodes wherein the treated coke is incorporated with a conventional pitch binder to form a carbonaceous mix which is then shaped or extruded, baked to carbonize the binder and, if desired, graphitized. The principal advantage offered by this improved process is that the manufacturer of carbon and graphite articles or electrodes can now employ lower-priced, high sulfur petroleum cokes and yet produce high-quality electrodes.

What is claimed is:

1. A process for treating high sulfur petroleum coke particles which comprises:

reacting said petroleum coke particles in the absence of a binder with a compound containing an alkali metal selected from the group consisting of sodium and potassium at an elevated temperature above that at which said compound begins to react with carbon but below the temperature at which said coke particles would begin to puff in the absence of said compound;

maintaining said coke particles and said compound at said elevated temperature for a sufficient period of time to permit the reaction to proceed and to allow products of the reaction to penetrate said coke particles and form a sodium or potassium-containing deposit throughout the mass of said particles; and cooling the so-treated coke particles.

2. A process according to claim 1, wherein said coke particles are raw petroleum coke.

3. A process according to claim 1, wherein said coke particles are calcined coke.

4. A process according to claim 1, wherein said alkali metal compound is admixed with said coke particles prior to reacting said alkali metal compound with said coke particles at said elevated temperature.

5. A process according to claim 1, wherein an aqueous solution containing said alkali metal compound is sprayed onto said coke particles prior to reacting said alkali metal compound and said coke particles at said elevated temperature.

6. A process according to claim 1, wherein said coke particles are heated to a temperature of at least about 750° C. prior to reacting said coke particles with said alkali metal compound at said elevated temperature.

7. A process according to claim 1, wherein said elevated temperature is between about 1200° C. and 1400° C. and wherein said alkali metal compound is in the form of dry, granulated powders.

8. A process according to claim 1, wherein said alkali metal compound is sodium carbonate.

9. A process according to claim 1, wherein said alkali metal compound is potassium carbonate.

10. A process for treating high sulfur petroleum coke particles which comprises:
calcining said petroleum coke particles;
adding sodium carbonate to the calcined coke particles at a temperature above about 1200° C. but below the temperature at which said calcined coke particles begin to puff in the absence of said sodium carbonate;
maintaining said calcined coke particles and said sodium carbonate at said temperature for a sufficient period of time to permit said sodium carbonate to react with carbon and to allow products of the reaction to penetrate said coke particles and form a sodium containing deposit throughout the mass of said calcined coke particles; and
cooling the so-treated coke particles.

11. A process according to claim 10, wherein said sodium carbonate is added to said calcined coke particles in the form of dry granulated powders.

12. A process according to claim 10, wherein said sodium carbonate powders are added to said calcined coke particles at a temperature within a range of above about 1200° C. to about 1400° C.

13. A process according to claim 12, wherein said sodium carbonate powders are added to said calcined coke particles in amounts greater than about 0.2 percent by weight of the to calcined coke particles.

14. A process according to claim 11, wherein said calcined coke particles and said sodium carbonate powders are maintained at said temperature for at least about 30 seconds.

15. In a process for calcining a raw petroleum coke wherein particles of said coke are passed through a rotating calciner having a discharge end while heating said particles to calcining temperatures;
the improvement whereby said calcined coke particles are treated to inhibit puffing of said calcined coke, said improvement comprising:
adding sodium carbonate in the form of dry, granulated powder to the calcined coke particles in a hot zone communicating with said discharge end of said calcining kiln at a temperature within the range of between about 1200° C. and 1400° C.; and
maintaining said calcined coke particles and sodium carbonate at said temperature while in said hot zone for a sufficient period of time to permit said sodium carbonate to react with carbon and to allow products of the reaction to penetrate said calcined coke particles and form a sodium containing deposit throughout the mass of said calcined coke particles.

16. A process according to claim 15, wherein said sodium carbonate powder is added to said calcined coke particles in amounts ranging from about 0.2 to about 2.5 percent by weight of the calcined coke particles.

17. A process according to claim 16, wherein said sodium carbonate powder is added to said calcined coke particles in amounts ranging from about 0.5 to about 2.5 percent by weight of the calcined coke particles.

18. A process according to claim 15, wherein said calcined coke particles and said sodium carbonate are maintained at said temperature for at least about one minute.

19. A process for producing a carbon article from a high sulfur petroleum coke comprising:
reacting particles of said petroleum coke with a compound containing an alkali metal selected from the group consisting of sodium and potassium at an elevated temperature above that at which said compound begins to react with carbon but below the temperature at which said coke particles would begin to puff in the absence of said compound;
maintaining said coke particles and said compound at said elevated temperature for a sufficient period of time to permit the reaction to proceed and to allow products of the reaction to penetrate said coke particles and form a sodium or potassium-containing deposit throughout the mass of said particles;
cooling the so-treated coke particles;
mixing the cooled coke particles with a pitch binder;
forming the mixture into an article of desired shape; and
baking the shaped article to a temperature sufficient to carbonize the binder.

20. A process according to claim 19, wherein the baked article is heated to a sufficiently high temperature to graphitize said article.

21. A process according to claim 19, wherein said elevated temperature is between about 1200° C. and 1400° C. and wherein said alkali metal compound is in the form of dry, granulated powders.

22. A process for producing a carbon electrode from a high sulfur petroleum coke comprising, in combination:
calcining particles of said petroleum coke;

adding sodium carbonate in the form of dry, granulated powder to the calcined coke ptartcles at a temperature above about 1200° C. but below the temperature at which said calcined coke particles begin to puff in the absence of said sodium carbonate;

maintaining said calcined coke particles and said sodium carbonate at said temperature for a sufficient period of time to permit sodium carbonate to react with carbon and to allow products of the reaction to penetrate said calcined coke particles and form a sodium containing deposit throughout the mass of said calcined coke particles;

cooling the so-treated calcined coke particles;

mixing the cooled calcined coke particles with a pitch binder;

forming the mixture into the desired shape of said electrode; and baking the shaped electrode to an elevated temperature sufficient to carbonize the binder.

23. A process according to claim 22, wherein said shaped electrode is heated to elevated temperature above about 2800° C. to graphitize said electrode.

* * * * *

UNITED STATES PATENT AND TRADEMARK OFFICE
CERTIFICATE OF CORRECTION

PATENT NO. : 4,875,979
DATED : October 24, 1989
INVENTOR(S) : T.H. Orac, H.C. Quandt, D.R. Ball It is certified that error appears in the above-identified patent and that said Letters Patent is hereby corrected as shown below:

Col. 1, line 60 "overcomes" should read ---overcome---
Col. 1, line 66 "table" should read ---Table---
Col. 2, line 57 "to" first occurrence should read ---of---
Col. 4, line 15, "FIG." should read ---FIGS.---
Col. 4, line 26 "FIGS." should read ---FIG.---
Col. 4, line 33 "partical" should read ---particle---
Col. 5, line 22 "expands" should read ---expand---
Col. 7, line 6 "entter" should read ---enter---
Col. 7, line 22 "circulr" should read ---circular---
Col. 7, line 24 "nezzles" should read ---nozzles---
Col. 9, line 17 "grate" should read ---rate---
Col. 9, line 12 "measurement," should read ---measurements,---
Col. 10, line 19 "wase" should read ---was---
Col. 12, line 17 "essentialy" should read ---essentially---
Col. 12, line 46 delete "the" second occurrence
Col. 12, line 56 "particles" should read ---articles---

UNITED STATES PATENT AND TRADEMARK OFFICE
CERTIFICATE OF CORRECTION

Page 2 of 2

PATENT NO. : 4,875,979
DATED : October 24, 1989
INVENTOR(S) : T.H. Orac, H.C. Quandt, D.R. Ball It is certified that error appears in the above-identified patent and that said Letters Patent is hereby corrected as shown below:

Col. 13, Claim 10, lines 54 and 57 ---calcined--- should be inserted before "coke particles"

Col. 13, Claim 13, line 68 delete "to"

Col. 14, Claim 15, line 17 insert ---said--- before "sodium"

Col. 16, Claim 23, line 11 "temperature" should read ---temperatures---

Signed and Sealed this

Twenty-first Day of May, 1991

Attest:

HARRY F. MANBECK, JR.

Attesting Officer

Commissioner of Patents and Trademarks